J. P. COSTELLOE.
ELECTROPNEUMATIC AIR BRAKE SYSTEM.
APPLICATION FILED APR. 1, 1914.
1,115,286.
Patented Oct. 27, 1914.
2 SHEETS—SHEET 2.
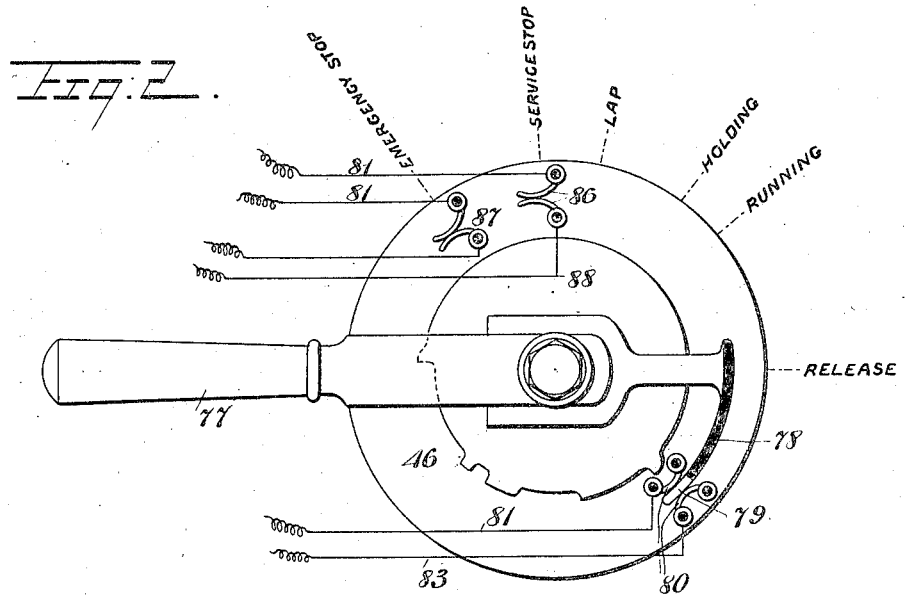
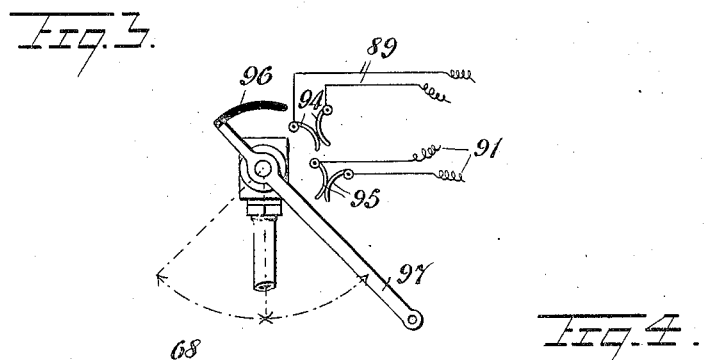
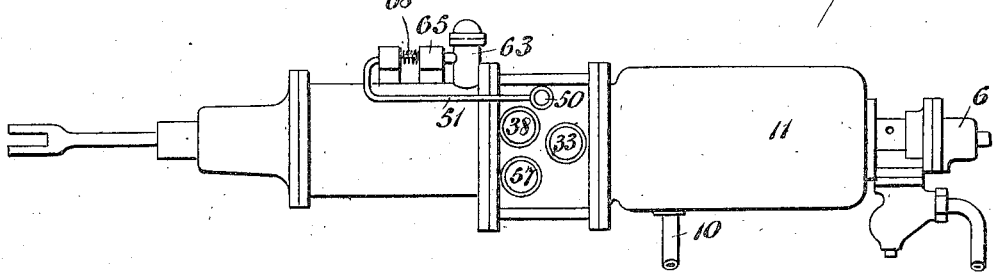
WITNESSES
H. I. Walker
INVENTOR
John Patrick Costelloe
BY Munn & Co
ATTORNEYS

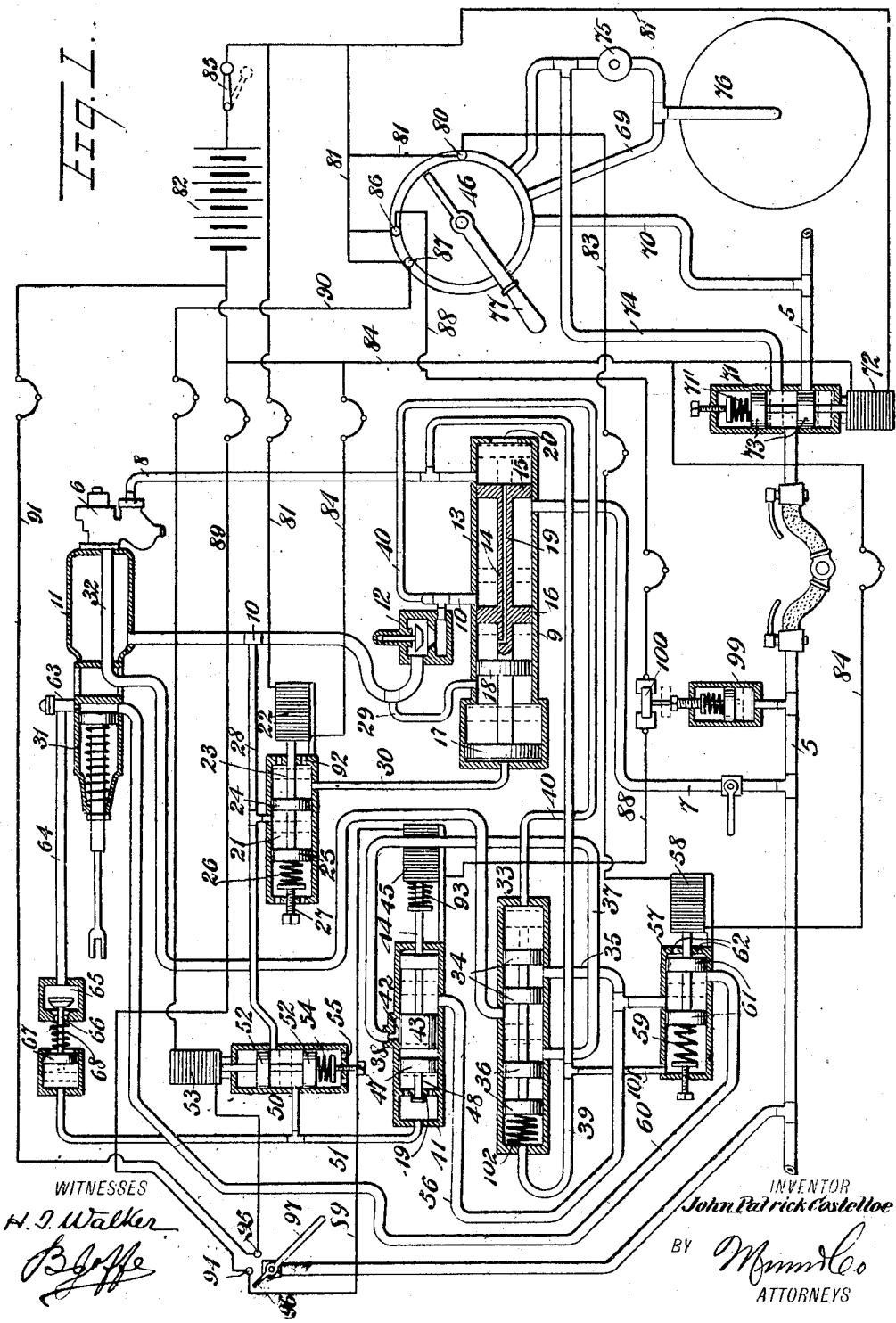

UNITED STATES PATENT OFFICE.

JOHN PATRICK COSTELLOE, OF MEDICINE HAT, ALBERTA, CANADA.

ELECTROPNEUMATIC AIR-BRAKE SYSTEM.

1,115,286. Specification of Letters Patent. Patented Oct. 27, 1914.

Application filed April 1, 1914. Serial No. 828,750.

*To all whom it may concern:*

Be it known that I, JOHN PATRICK COSTELLOE, a subject of the King of Great Britain, and a resident of Medicine Hat, Province of Alberta, and Dominion of Canada, have invented a new and Improved Electropneumatic Air-Brake System, of which the following is a full, clear, and exact description.

My invention relates to automatic, fluid-pressure brakes in use on railways.

An object thereof is to provide a simple and efficient electro-pneumatic brake system which can be easily and at little cost applied to standard automatic fluid brakes, which is automatic in action and uniform in operation and which will actuate the brakes simultaneously throughout the train.

Another object of the invention is to provide a brake system which will permit the use of the same as a standard pneumatic system or as an electro-pneumatic system; and the change from one to the other can be made instantaneously.

A further object of the invention is to provide an electro-pneumatic air brake system wherein the auxiliary reservoir can be charged from the train pipe during the application of the brakes, thus full emergency pressure is obtained at any time after service application.

A further object of the invention is to cause a service application of the brakes in case the pressure in the train pipe falls below a predetermined danger point due to low a predetermined danger point due to leakage or any other cause.

A still further object of the invention is to produce an electro-pneumatic system which is as flexible as the standard pneumatic system and wherein a predetermined and maximum practicable difference between service and emergency breaking power is obtained.

I attain these objects by the mechanism illustrated diagrammatically in the accompanying drawings forming a part of the specification, in which similar characters of reference indicate corresponding parts in all the views and wherein—

Figure 1 is a diagrammatic view of the system as applied to a car, and also showing a portion of the engine equipment and the engineer's valve as connected therewith; Fig. 2 is a plan view of the engineer's valve provided with an electric control of the system; Fig. 3 is a conductor's valve; and Fig. 4 is an exterior view of the auxiliary reservoir, brake cylinder and the valve casing therebetween, comprising the application valve, application control valve, the release control and the emergency control.

Before proceeding to a more detailed description of my invention, it must be clearly understood that the standard equipment of the cars remains substantially unaltered. An extra valve is provided whereby the auxiliary reservoir can be brought directly into connection with the train pipe and the triple valve placed into emergency position when that connection is made. A further change is made in the conduit from the triple valve to the brake cylinder which is provided with a valve system becoming operable when the triple valve is placed into emergency position by the valve controlling the communication of the auxiliary reservoir with the train pipe. All of the valves in my system being electro-magnetically controlled, attention is called to the fact that when the system is in operation all the triple valves are placed into emergency position and the brakes are operable by the valve system provided in the conduit from the triple valve to the brake cylinder.

Referring to the drawings, the conduit from the train pipe 5 through the triple valve 6 is divided into two parts 7 and 8 by a differential piston valve 9. An auxiliary conduit 10 leads also from the differential valve 9 to the auxiliary reservoir 11, to which the triple valve is connected in the customary way. Said auxiliary conduit 10 is provided with a check valve 12 which checks the return flow from the auxiliary to the differential valve 9.

The differential valve 9 comprises a casing 13 within which a piston valve 14 is mounted. The pistons 15 and 16 of said piston valve 14 control the connection of the conduit 7 with the conduits 8 and 10; while the piston 17, which is larger than the pistons 15 and 16, is intended as a means for moving the piston valve 14 into the desired position. A piston 18 prevents the escape of the fluid controlling the piston valve 14 through the exhaust bore 19 provided in the stem and leading to the port 20 provided in the casing 13 which leads to the atmosphere, and also by said piston the differentiation is obtained for moving the valve 14.

The differential valve 9 is controlled by a piston valve 21 operable by an electro-magnet 22, which engages a stem 23 of the valve and on which stem the pistons 24 and 25 are mounted. A resilient member 26 tends to place the piston valve 21 into inoperative position. The tension of the spring 26 can be varied by the screw 27 provided in the casing of the valve. The said valve 21 controls the fluid flow from the auxiliary conduit 10 to the full side of the piston 17 in the differential valve 9. A conduit 28 connects the valve 21 to the conduit 10; and conduit 30 connects the full side of the piston 17 to said valve 21, which as shown in Fig. 1, connects the conduit 30 to the atmosphere. The fluid from the auxiliary conduit 10 flows through a conduit 29 on the differential side of the piston 17 and the valve is placed into operative position, thus causing the flow of fluid from the train pipe to the auxiliary conduit 10 and connecting the conduit 8 leading to the triple valve with the atmosphere through the port 20 of the valve, thus setting the triple valve into emergency position, whereby the conduit from the triple valve to the brake cylinder is brought into communication with the auxiliary cylinder 11.

The conduit from the triple valve 6 to the brake cylinder 31 is formed of a plurality of parts, of which the part 32 connects the triple valve to a piston valve 33, the pistons 34 of such valve controlling the connection of the conduit 32 with a conduit 35, while the piston 36, positioned at the other end of the piston valve control the connection of the conduit 32 with the conduit 37 leading to an application valve 38. The piston valve 33 is controlled pneumatically by means of conduits 39 and 40 leading from the opposite ends of the casing of said valve to the conduits 8 and 10. It will be seen from the drawing that when the conduit 8, leading from the triple valve, exhausts to the atmosphere the conduit 39 will, similarly, communicate with the atmosphere, while fluid will flow into the opposite end of the casing of the piston valve 33 through the conduit 40 which is connected to the auxiliary conduit 10. The reverse will take place when the differential valve 9 is placed to connect the auxiliary conduit 10 to the atmosphere and the conduit 8 of the triple valve to the train pipe.

The casing 41 of the application valve is provided with an elongated port 42 into which the conduit 37 enters. The port 42 is controlled by a piston 43 mounted on a stem 44 engaged in an electro-magnet 45, which electro-magnet is controllable from the engineer's valve 46. A piston 47 is mounted to slide in the casing 41 independent of the piston 43. A stem 48 of the piston 47 engages a perforated partition 49 provided in the casing and which forms a stop limiting the movement of the piston 47.

The piston 47 is pneumatically operated, and its position is controlled by a small piston valve 50 placed in an extension of the conduit 28 leading to the end of the casing 41 adjacent the partition 49. A part 51 of the conduit, lying between the application valve and the valve 50, is brought into communication with the conduit 28, or with the atmosphere, by means of the pistons 52 of the valve, the valve being operated by a magnet 53. When the electro-magnet is energized, pressure is applied to the piston 47 in the application valve, i. e., the conduit 51 is in communication with the conduit 28. When the electro-magnet is deënergized a spring 54 forces the valve 50 into inoperative position and brings the conduit 51 into communication with the atmosphere by means of ports 55 provided in the casing of the valve 50. The piston 43, when the magnet 45 is energized, prevents the flow of the fluid from the conduit 37 into the conduit 56, which conduit 56 unites with the conduit 35 before entering a release valve 57. The release valve is preferably of the piston type and controlled by an electro-magnet 58 normally deënergized when the rest of the electro-magnets are energized. A spring 59 maintains the release valve in inoperative position and brings the conduits 56 and 35 into communication with a conduit 60 leading to the brake cylinder. When pistons 61 of the valve 57 are forced by the electro-magnet into operative position, the conduit 60 is brought into communication with the atmosphere and, simultaneously, is cut off from the conduits 56 and 35. The communication of the conduit 60 with the atmosphere is established by the provision of ports 62 in the end of the casing of the release valve 57.

The brake cylinder 31 is provided with a release valve 63 which maintains a predetermined pressure within said cylinder, the excessive pressure in the cylinder escaping through the valve 63 into a conduit 64 leading to a casing 65 having a valve-controlled outlet 66. The valve is raised from its seat by pneumatic pressure applied to a piston 67 carried by the valve and to which the fluid pressure is supplied by the extension of the conduit 51. Thus it will be noted that the valve opening 66 is controlled also by the valve 50 which controls the piston 47 within the application valve. When the conduit 51 is communicating with the atmosphere, that is, cut off from the conduit 28, the valve-opening 66 is closed by the spring 68 provided on the valve stem, and thus the fluid passing through the safety valve 63 cannot escape from the casing 65. The reason for this will appear hereinafter.

The engineer's valve 46 is connected to the main reservoir 76 by a conduit 69 and to the train pipe by a conduit 70. On the engine the train pipe is provided with a piston valve 71 controlled by an electro-magnet 72. The pistons 73 of the valve 71 normally connect the train pipe of the cars with the train pipe 5 of the engine, but when the electro-magnet 72 is energized, the train pipe 5 of the engine is cut off from the train pipe 5 of the cars and a conduit 74 is brought into communication with the train pipe of the cars. This conduit 74 leads to a feed valve 75, whereby the car train pipe is directly connected to the main reservoir 76. From the above it will be seen that a handle 77 of the engineer's valve 46 controls the supply of air directly to the brakes attached to the engine, that is, the standard equipment of the engine is not changed. The brakes of the cars coupled to the engine, are controllable also by means of said handle, which handle is provided with proper means for establishing or breaking the circuit controlling the electro-magnet which operates the valve.

The handle 77 is provided with an insulated member 78 which carries a conductor 79 adapted to engage between contacts 80 when the handle 77 is placed into release position. One of the contacts 80 is connected by a conductor 81 to a source of electricity 82 provided on the engine; and the other contact 80 is connected by a conductor 83 to the magnet 58 controlling the release valve 57. The magnet 58 is also connected to the source of electricity by a conductor 84, making a complete circuit therebetween. When the handle is in such a position as shown in Fig. 2, i. e., in release position, and the switch 85 on the conductor 81 is closed, the magnet 58 will be energized, forcing the piston 61 of the release valve against the spring 59, thus cutting off the communication between the conduits 56 and 60 and placing the conduit 60 into communication with the atmosphere by means of the ports 62, as previously stated, thus reducing the pressure of the brake cylinder, thereby releasing the brakes. Therefore, it may be remarked that normally when the switch 85 is closed, the electro-magnet 58 is not in the circuit. The engineer's valve 46 is also provided with a pair of normally engaging contacts 86 and 87. One of the contacts 86 is connected to the conductor 81; and the other contact 86 is connected by means of a conductor 88 to the electro-magnet 45, the electro-magnet 45, in turn, being connected by a conductor 89 to the source of electricity, so as to complete the circuit, as it is shown in Fig. 2. The electro-magnet 45 is always in circuit as long as the switch 85 is closed. One of the engaging contacts 87 is connected to the conductor 81, while the other is connected by a conductor 90 to the electro-magnet 53, which is, in turn, connected to the source by a conductor 91, thus completing the circuit; and, as it appears, the electro-magnet 53 is always in the circuit when the switch 85 is closed.

The electro-magnets 22 and 72 are connected to the wires 81 and 84 and are controllable directly by the switch 85, i. e., when the switch 85 is closed, the electro-magnets 22 and 72 are energized, whereby the pistons 73 of the valve 71 are forced against the spring 71'; the train pipe of the locomotive is cut off from the train pipe leading to the car; and the conduit 74 from the main tank is brought into communication with the train pipe of the car. The pistons 24 and 25 are forced into the position indicated in Fig. 1, and thus the conduit 30 is brought into communication with the atmosphere by the ports 92 provided in the casing of the valve 21. Thus the pressure at full side of the piston 17 will be reduced, while on the opposite side the existing differential pressure will move the valve 14 to the position indicated in Fig. 1, thus bringing the conduit 7 of the train pipe 5 into communication with the auxiliary conduit 10 leading to the auxiliary reservoir 11. The conduit 8 is brought into communication with the atmosphere, and therefore the triple valve 6 is placed in the emergency position. The reduction in pressure in the conduit 8 will cause a corresponding reduction in pressure at the end of the valve 33 connected with the conduit 8 by the conduit 39, while at the opposite end of the valve the pressure will be increased due to the fact that the conduit 40 connects the said end to the auxiliary conduit 10. This will cause a displacement of the piston valve; and the fluid conduit 32 from the triple valve is brought into communication with the conduit 37 leading to the application valve. The closing of the switch 85 will also energize the magnets 45 and 53. The magnets 45 will move the piston 43 across the port 42 and close the same, preventing the flow of fluid from the conduit 37 into the conduit 56. The electro-magnet 53 will force the valve 50 into operative position, thus supplying a fluid pressure to the piston 47 and forcing the same into the position shown in Fig. 1; also said pressure will force the piston 67 against the spring 68 and open the valve controlling the casing 65.

When the engineer desires to make an application of the brakes, he moves his handle to the service position, forcing the insulated portion 78 of the handle between the contacts 86, thus breaking the circuit to the electro-magnet 45. A spring 93 will then force the piston 43 against the piston 47 and uncover a part of the port 42, thus permitting a flow of fluid from the auxiliary reservoir to the brake cylinder and making an application. It will be seen that during this application of the brakes the auxiliary reservoir is continuously supplied with air from the train pipe. To release the brakes, the engineer moves his valve to the position shown in Fig. 2, obtaining the condition previously explained. When the handle is moved to the emergency position, the insulated portion 78 breaks the contact 87; but previous to that the contact 86 will be broken by said insulated portion; therefore the electro-magnet 45, as well as the electro-magnet 53, will be deënergized. The spring 54 of the valve 50 will force the pistons 52 of the valve into normal position, cutting off the supply of fluid pressure to pistons 47 and 67 and reducing the same to the atmospheric pressure. This reduction of pressure on the piston 47 will permit the spring 93 to force the piston 43 to its limit position, i. e., bring the piston 47 against the partition 49, thus uncovering the entire port 42. The spring 68 will close the exhaust from the casing 65. The full opening of the port 42 will permit a large flow of fluid from the auxiliary reservoir into the brake cylinder; and if the pressure of the air supply to the brake cylinder is higher than that for which the release valve 63 is designed, the fluid pressure of said air will take effect on the brake, as there is no escape for the excess of pressure through the conduit 64. This provision insures a positive and rapid application of the brake in case of emergency. The release of the brake is obtained, as previously described, by bringing the handle to the position indicated in Fig. 2.

To permit the conductor to apply the brakes independently of the engineer, the electric conductors 89 and 91 are each provided with contacting members 94 and 95 adapted to be separated by an insulated member 96 mounted on a handle 97 of the valve which controls the standard brake system; the operation of which handle 97 is similar to that of the handle 77 described in respect to the contact members 86 and 87.

When the switch 85 is open, the supply of electricity is cut off from all of the electro-magnets and they are deënergized. The spring 71' will force the pistons 73 of the valve 71 into the normal position, cutting off the conduits 74 from the car train pipe 5 and bringing the train pipe 5 of the engine into communication therewith, as indicated in dotted line in Fig. 1. The spring 26 will force the pistons 24 and 25 of the valve 21 into the normal position, bringing the conduit 30 into communication with the auxiliary reservoir. Thus an excess of pressure is applied to the full side of piston 17, causing the differential valve 16 to move into the position indicated in dotted lines in Fig. 1. This displacement of the differential valve will cut off the supply of air to the auxiliary reservoir, through the auxiliary conduit 10, which is connected to the atmosphere by the bore 19 and connect the auxiliary reservoir to the train pipe through the conduit 8, i. e., through the triple valve 6, which is the standard connection. This movement of the differential valve will cause a change of end pressure in the valve 33 and the same will be moved to the position indicated in dotted line in Fig. 1, bringing the conduit 32 into communication with the conduit 35 and conduit 60, and cutting off the conduit 37 from the conduit 32. The spring 54 will place the pistons 52 of the valve 50 into normal position, releasing the pressure on the piston 67 and thus preventing the movement of the release valve 63 when the pressure in the brake cylinder is above the predetermined pressure at which the release valve 63 operates as previously described. Therefore, the opening of the switch will change the electro-pneumatic system into an ordinary standard pneumatic system. The triple valve will then control the brake systems directly through the conduits 32, 35 and 60 by means of the engineer's valve 46, as is ordinarily done.

On the train pipe of each car there is also provided a pneumatic valve 99 controllable by the pressure of the train pipe which is connected to a switch 100 provided in the electric conductor 88 leading to the electro-magnet 45, and which breaks the circuit to the said electro-magnet when there is a lowering in pressure in said train pipe below a predetermined point. This breaking in circuit causes an automatic service application of the brakes. The curves in the electric conductors and in the train pipe indicate the connections between units of the electro-pneumatic system.

When the standard system is in use, the switch 85 is in position shown in dotted line in Fig. 1. To insure the proper position of the release valve when the standard system is in use, a pneumatic pressure is supplied in addition to the spring 59 by means of a conduit 101 branching off from the conduit 39. This insures the position of said valve, as the same is never supposed to be utilized when the brakes are operated by the reduction of pressure in the train pipe by means of the engineer's valve 46. To prevent an accidental displacement of the valve 33 when an emergency application is made by the standard system, a spring 102 is provided which will maintain the valve 33 in the position shown in dotted line in Fig. 1 when the standard brake system is employed. The reason for providing said spring is that when an emergency application is made the train pipe is exhausted and, therefore, there will be no pressure on either side of the pistons of the valve 33.

The reason for placing the electro-magnets 45 and 53 in a closed circuit is to insure the safety of the system, so that if any rupture in the train takes place, an application of the brake will take place when the electro-pneumatic system is in use; but, if desired, the electro-magnets 45 and 53 can be in an open circuit similar to the electro-magnet 58. It may also be remarked that the fluctuation in pressure of the train pipe 5 will in no way affect the brakes unless the pressure in the train pipe falls below a predetermined point, breaking the circuit to the electro-magnet 45 by means of the switch 100. Therefore there will be no dragging of the wheels due to the application of the brake, which ordinarily occurs where there is a fluctuation in pressure in the train pipe. It is self-evident that by the electric control, the application and release of the brakes in each unit of the system take place simultaneously, and, as previously stated, the brakes of the engine remain under the control of the standard system.

It is evident that various changes might be made and modifications resorted to in the construction and arrangement of the parts described without departing from the spirit and scope of my invention; hence, I do not wish to limit myself to the exact construction shown.

Having thus described my invention, I claim as new and desire to secure by Letters Patent:

1. In an electro-pneumatic brake system, the combination with a train pipe, auxiliary reservoir, triple valve and brake cylinder, of an electrically-controlled system, including means for connecting the auxiliary reservoir directly to the train pipe and controlling the brakes through the triple valve placed in emergency position.

2. In an electro-pneumatic brake system, the combination with a train pipe, auxiliary reservoir, triple valve and brake cylinder, of an electrically-controlled system comprising, a valve, electro-magnetically controlled, for placing the triple valve into emergency position and connecting the auxiliary reservoir directly to the train pipe; and an application valve, electro-magnetically controlled, between the triple valve and the brake cylinder.

3. In an electro-pneumatic brake system, the combination with a train pipe, auxiliary reservoir, triple valve and brake cylinder of an electrically-controlled system comprising, a valve, electro-magnetically controlled, for placing the triple valve into emergency position and connecting the auxiliary reservoir directly to the train pipe; an application valve, electro-magnetically controlled between the triple valve and the brake cylinder; and means associated with said valves whereby said application valve is brought into operative position when the other valve places the triple valve into emergency position.

4. In an electro-pneumatic brake system, the combination with a train pipe, auxiliary reservoir, triple valve and brake cylinder, of an electrically-controlled system comprising a valve, electro-magnetically controlled, for placing the triple valve into emergency position and connecting the auxiliary reservoir to the train pipe; and an application valve, electro-magnetically controlled, operating the brake through the triple valve when the same is placed in the emergency position by said first mentioned valve.

5. In an electro-pneumatic brake system, the combination with a train pipe, auxiliary reservoir, triple valve and brake cylinder, of an electrically-controlled system comprising an application valve, electro-magnetically controlled, intermediate the triple valve and the brake cylinder; a valve, electro-magnetically controlled, for placing the triple valve into emergency position and connecting the auxiliary reservoir to the train pipe; and a release valve associated with the brake cylinder and electro-magnetically controlled.

6. In an electro-pneumatic brake system, the combination with a train pipe, auxiliary reservoir, triple valve and brake cylinder, of an electrically-controlled system comprising an application valve between the triple valve and the brake cylinder; a valve controlling the connection of the auxiliary reservoir with the train pipe whereby the auxiliary reservoir can be connected to the train pipe either through the triple valve or direct; and a release valve associated with the brake cylinder, all of said valves being electro-magnetically controlled.

7. In an electro-pneumatic brake system, the combination with a train pipe, auxiliary reservoir, triple valve and brake cylinder, of an electrically controlled system comprising a pneumatically-operable valve for placing the triple valve into emergency position and connecting the auxiliary reservoir directly to the train pipe; an electro-magnetically-operable valve controlling the first mentioned valve; an application valve, electro-magnetically controlled, between the triple valve and the brake cylinder; and an electro-magnetically controlled release valve intermediate the application valve and the brake cylinder.

8. In an electro-pneumatic brake system, the combination with a train pipe, auxiliary reservoir, triple valve and brake cylinder, of an electrically-controlled system comprising an application valve between the triple valve and the brake cylinder; a release valve intermediate the application valve and the brake cylinder; and a valve controlling the connection of the auxiliary reservoir with the train pipe, all of said valves being electro-magnetically operated.

9. In an electro-pneumatic brake system, the combination with a train pipe, auxiliary reservoir, triple valve and brake cylinder, of an electrically-controlled system comprising an application valve between the triple valve and the brake cylinder; a release valve intermediate the application valve and the brake cylinder; a valve controlling the connection of the auxiliary reservoir with the train pipe, all of said valves being electro-magnetically operated; and a pneumatic valve controllable by the last mentioned valve whereby the application valve is cut in or cut out between the triple valve and the brake cylinder.

10. In an electro-pneumatic brake system, the combination with a train pipe, auxiliary reservoir, triple valve and brake cylinder, of an electrically-controlled system comprising an application valve between the triple valve and the brake cylinder; a release valve between the application valve and the brake cylinder; a valve between the application valve and triple valve whereby the brake cylinder may be controlled either by the triple valve or by the application valve; and a valve between the auxiliary reservoir and the train pipe controlling the connection therebetween, the application valve, release valve, and last mentioned valve being operable electro-magnetically.

11. In an electro-pneumatic brake system, the combination with a train pipe, auxiliary reservoir, triple valve and brake cylinder, of an electrically-controlled system, including means for severing the train pipe of the cars from the train pipe of the engine, and means feeding each of the severed parts of the train pipe independently.

12. In an electro-pneumatic brake system, the combination with a main reservoir, train pipe, auxiliary reservoir, triple valve, brake cylinder and engineer's valve of an electrically-controlled system, including means for disconnecting the train pipe from the engineer's valve and connecting the same to the main reservoir.

13. In an electro-pneumatic brake system, the combination with a main reservoir, train pipe, auxiliary reservoir, triple valve, brake cylinder and engineer's valve of an electrically-controlled system, including an electro-magnetically operable valve positioned in the train pipe for severing the connection of the train pipe from the engineer's valve and connecting the same to the main reservoir.

14. In an electro-pneumatic brake system, the combination with a main reservoir, train pipe, auxiliary reservoir, triple valve, brake cylinder and engineer's valve of an electrically operable valve system controllable from the engineer's valve, of an electro-magnetically controlled valve in the train pipe between said electrically operable valve system and the engineer's valve, said valve in the train pipe being adapted to sever the connection between the engineer's valve and the train pipe and connect the train pipe to the main reservoir.

15. In an electro-pneumatic brake system, the combination with a train pipe, auxiliary reservoir, triple valve and brake cylinder of an electrically-controlled system comprising, an application valve, a valve controlling the displacement of said application valve whereby a service or emergency application can be made, and electro-magnetic means for operating said valves.

16. In an electro-pneumatic brake system, the combination with a train pipe, auxiliary reservoir, triple valve and brake cylinder of an electrically-controlled system comprising an application valve, a valve controlling the service and the emergency application of the valve, and means associated with said second valve and the brake cylinder whereby the full pressure of the train pipe can be applied to the brakes.

17. In an electro-pneumatic brake system, the combination with a train pipe, auxiliary reservoir, triple valve and brake cylinder of a relief valve for a brake cylinder whereby a predetermined pressure only can be applied on the brakes of an electrically-controlled system comprising an application valve, a valve controlling the displacement of the application valve; and means associated with the relief valve and controllable by the fourth mentioned valve whereby the pressure of the brake cylinder may be raised above that controlled by the relief valve.

18. In an electro-pneumatic brake system, the combination with a train pipe, auxiliary reservoir, triple valve and brake cylinder of a relief valve for the brake cylinder adapted to prevent a pressure on the brakes above a predetermined one, of an electrically controlled system comprising an electro-magnetically controlled application valve, an electro-magnetically operable valve controlling the displacement of the application valve, and a valve controlling the exhaust of said relief valve, said exhaust valve being controllable by said valve controlling the displacement of the application valve and closed when the application valve is permitted to be displaced by said valve to the emergency position.

19. In an electro-pneumatic brake system, the combination of a train pipe, auxiliary reservoir, triple valve, brake cylinder and engineer's valve of an electrically controlled system comprising an electro-magnetically controlled valve for placing the triple valve into emergency position and connecting the auxiliary reservoir directly to the train pipe, an electrically controllable application valve intermediate the triple valve and the brake cylinder, an electrically controllable release valve intermediate the application valve and the brake cylinder, and means associated with the engineer's valve whereby the application and release valves are controllable therefrom.

20. In an electro-pneumatic brake system, the combination of a train pipe, auxiliary reservoir, triple valve and brake cylinder of an electrically controlled system comprising a pneumatically operable valve for placing the triple valve into emergency position and connecting the auxiliary reservoir to the train pipe, an electro-magnetically operable valve supplying the pressure for the displacement of said first mentioned valve, an electro-magnetically controlled application valve, a second pneumatic valve controllable by the first pneumatic valve and connecting the brake cylinder with either the triple valve or the application valve, and an electro-magnetically controlled release valve intermediate the application valve and the brake cylinder.

21. In an electro-pneumatic brake system, the combination with a main reservoir, train pipe, auxiliary reservoir, triple valve, brake cylinder and engineer's valve of an electrically controlled system comprising an electro-magnetically controlled valve in the train pipe for connecting the train pipe either to the engineer's valve or to the main reservoir, a pneumatically operable valve for connecting the train pipe either directly to the auxiliary reservoir or to the triple valve, whereby when the auxiliary reservoir is connected directly to the train pipe the triple valve is placed into emergency position by said valve, an electro-magnetically operable valve controlling the operation of the pneumatically-operable valve, an electro-magnetically-controlled application valve, a second pneumatically operable valve controllable by the first pneumatic valve for connecting or disconnecting said application valve from the brake cylinder, an electro-magnetically-operable valve controlling the displacement of the application valve, and an electro-magnetically-controlled release valve, said release valve, application valve and valve controlling the displacement of the application valve being controllable from the engineer's valve.

22. In an electro-pneumatic brake system, the combination with a main reservoir, train pipe, auxiliary reservoir, triple valve, brake cylinder and engineer's valve of an electrically controlled system comprising an electro-magnetically-controlled valve positioned in the train pipe whereby the train pipe may be connected either to the engineer's valve or to the main reservoir, an electro-magnetically-controlled valve for feeding the auxiliary reservoir directly from the train pipe or through the triple valve whereby when said auxiliary is fed directly the triple valve is placed in the emergency position, an electro-magnetically operable application valve intermediate the triple valve and the brake cylinder, and an electro-magnetically-controllable release valve intermediate the application valve and the brake cylinder, said application valve and release valve being operable from the engineer's valve.

In testimony whereof I have signed my name to this specification in the presence of two subscribing witnesses.

JOHN PATRICK COSTELLOE.

Witnesses:
  BENEDICT JOFFE,
  PHILIP D. ROLLHAUS.

---

Copies of this patent may be obtained for five cents each, by addressing the "Commissioner of Patents, Washington, D. C."